(12) United States Patent
Chen

(10) Patent No.: US 6,546,164 B1
(45) Date of Patent: Apr. 8, 2003

(54) MINIATURE DENSE WAVELENGTH DIVISION MULTIPLEXER USING MICROBEND COUPLERS

(75) Inventor: Peter Zupei Chen, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 44 days.

(21) Appl. No.: 09/612,068

(22) Filed: Jul. 7, 2000

(51) Int. Cl.[7] .................................................. G02B 6/28
(52) U.S. Cl. .......................... 385/24; 385/32; 385/42; 385/43; 385/45; 359/115; 359/124
(58) Field of Search ........................... 385/42, 43, 46, 385/32, 24, 27, 45, 39; 359/115, 124

(56) References Cited

U.S. PATENT DOCUMENTS 5,138,676 A * 8/1992 Stowe et al. ................ 385/123
5,809,190 A * 9/1998 Chen ............................ 385/43
6,314,219 B1 * 11/2001 Zhang et al. ................. 385/32

* cited by examiner

Primary Examiner—Cassandra Spyrou
Assistant Examiner—Fayez Assaf
(74) Attorney, Agent, or Firm—Fish & Richardson P.C.

(57) ABSTRACT

A miniature dense wavelength division multiplexer (DWDM) is disclosed. A plurality of multi-window wavelength multiplexers (MWDM) are cascaded and optically coupled to form a tree, and each of the MWMDMs forming the tree comprises a microbend coupler. The forming of the MWDM tree is characterized by the absence of the bending of optical fibers external to the microbend couplers. A finished DWDM assembly measures less than 50 mm in width.

11 Claims, 7 Drawing Sheets

PRESENT INVENTION

MINIATURE DENSE WAVELENGTH DIVISION MULTIPLEXER USING MICROBEND COUPLERS

BACKGROUND OF THE INVENTION

1. Field of the Invention

The present invention relates to wavelength selective devices. In particular, the present invention relates to dense wavelength division multiplexers (DWDMs).

2. The Prior Art

Background

With the growing use of the Internet, users are accessing a wider variety of data, such as streaming voice and video, and as a result are placing greater demands on the existing Internet backbone. As a consequence, traditional coaxial cable, which forms the backbone of the Internet, can no longer support these increased demands. Thus, current information systems are continually being expanded to meet increasing bandwidth demands.

One viable alternative to the traditional coaxial backbone is optical fiber because of its potential for greatly increased bandwidth. Various methods have been proposed to maximize the bandwidth of optical systems.

One such system is disclosed in U.S. Pat. No. 5,809,190 (the '190 patent) to the present inventor. Therein, a Dense Wavelength-Division Multiplexer (DWDM) is disclosed which utilizes a Fused-Biconical Taper (FBT) technique.

FIG. 1 shows a prior art diagram of a 1×N DWDM 100 according to the '190 patent. As used herein, the symbol N indicates the number of channels that are used by a DWDM to multiplex or demultiplex a given input provided by an input fiber. The number N is equal to $2^m$ wherein m represents the number of times a DWDM performs signal divisions for the given input signal prior to their being demultiplexed at a receiving end.

Accordingly, the prior art DWDM is known as a m-stage DWDM in which MWDM 111 is a first stage Wavelength Division Multiplexer (WDM) having a window spacing of $\Delta\lambda$. Likewise, MWDMs 121 and 122 are a pair of second stage WDMs, each having a window spacing of $2\Delta\lambda$. MWDMs 131, 133, and 134 are a plurality of third stage WDMs, each having a window spacing of $4\Delta\lambda$.

Each of the WDMs in FIG. 1 has a window with a center wavelength which varies with its sequence in the DWDM. Each stage in the DWDM 100 may be designated as 1m1, 1m2, . . . , and $1m(2^{m-1})$, representing a m-th stage WDM of the DWDM. Regarding window spacing, the window spacing of a m-th stage MWDM is $2^{m-1}\Delta\lambda$, which is twice as large as a window spacing demonstrated by a m−1 stage MWDM, yet one half of the size of the window spacing of a m+1 stage MWDM. The number of stages m may be from be from 1 to n, where n=(logN/log2), forming a plurality of MWDMs, 1n1, 1n2, . . . , 1n(N/2).

Each channel of the DWDM 100 has only one window with a characteristic central wavelength corresponding to a particular center wavelength originating from the first stage WDMs. For example, in FIG. 1, each of the windows included in channel pathways 111–131 and 111–132 has a center wavelength identical to a center wavelength in corresponding window of the channel 121. Likewise, each of the windows in the channel pathways 111–133 and 111–134 has a center wavelength identical to a center wavelength in a corresponding window of the channel 122.

Referring still to FIG. 1, the operation of the DWDM 100 as a demultiplexer may now be shown. A lightwave signal having wavelengths $\lambda_1$–$\lambda_N$ are provided by fiber 10 to MWDM 111. Wavelength series $\lambda_1, \lambda_3, \ldots, \lambda_{N-1}$ is transmitted to WDM 121, and wavelength series $\lambda_2, \lambda_4, \ldots, \lambda_N$ is transmitted to WDM 122. FIGS. 2A and 2B show representative spectral distributions of the wavelength series where N=8.

Referring back to FIG. 1, after demultiplexing by subsequent stages, the light signals are demultiplexed into N individual channels and distributed to N individual fibers 11, 12, . . . , 1N.

Referring now to FIGS. 3A–3E, detailed embodiments of the DWDM of the '190 patent are shown. FIG. 3A is a logic diagram of a 1×4 DWDM according to the '190 patent, also known as a 4-channel DWDM. The first stage MWDM 311 is cascadedly connected to two second stage MWDMs 321 and 322. For demultiplexing purposes, a lightwave input having wavelengths $\lambda_1$–$\lambda_4$ are input on fiber 30, and outputs $\lambda_1, \lambda_2, \lambda_3$, and $\lambda_4$ are provided on fibers 31, 32, 33, and 34, respectively. For multiplexing purposes, the inputs and outputs are reversed. FIGS. 3C, 3D, and 3E show the respective insertion loss of the MWDMs 311, 321, and 322 wherein $\Delta\lambda$ is the window spacing and $\delta\lambda$ is the window bandwidth. The dash curve and the solid curve in FIG. 3C indicates respectively the insertion loss in channels 30–321 and 30–322. The dash curve and the solid curve in FIG. 3D indicates respectively the insertion loss in channels 34–311 and 34–311. The dash curve and the solid curve in FIG. 3E indicates respectively the insertion loss in channels 33–311 and 33–311.

FIG. 3B shows an actual physical structure of the '190 DWDM according to the '190 patent. The first stage MWDM 311 is cascadedly connected to two second stage MWDMs 321 and 322, and the DWDM of the '190 patent in housed in a container 35 having a length L and a width W.

As is appreciated by those of ordinary skill in the art, the length and width of container 35 is dictated by the radius R about which the optical fibers of the DWDM of FIG. 3B may be bent. As a consequence, the DWDM of the '190 patent suffers from certain disadvantages. While satisfactory for the purposes intended in terms of performance, the DWDM of the '190 patent suffers from size disadvantages. Due to the fused-biconical technique used in the DWMs of the '190 patent, the minimum radius about which fibers can be bent is approximately 35 mm. Thus, the minimum finished size of a DWDM according to the '190 patent has a length L of approximately 100 mm and a width W of approximately 50 mm.

Given the need to upgrade communications system as discussed above, there is an apparent need to fabricate a DWDM which is smaller in size than DWDMs of the prior art.

BRIEF DESCRIPTION OF THE INVENTION

The invention satisfies the above needs. The present invention relates to wavelength selective devices. In particular, the present invention relates to dense wavelength division multiplexers (DWDMs).

A miniature dense wavelength division multiplexer (DWDM) is disclosed.

In a first aspect of the present invention, a plurality of multi-window wavelength multiplexers (MWDMs) are cascaded and optically coupled to form a tree, and each of the MWDMs forming the tree comprises a microbend coupler.

In a second aspect of the present invention, the forming of the MWDM tree is characterized by the absence of the bending of optical fibers external to said microbend couplers.

A method for forming a DWDM is disclosed, which comprises providing a plurality of multi-window wavelength multiplexers (MWDMs) cascaded and optically coupled to form a tree, wherein each of the MWDMs of the tree comprises a microbend coupler.

Additional aspects of the present invention are disclosed wherein the DWDM formed by the present invention measures approximately 100 mm×50 mm, and as little as 50 mm×20 mm.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Fabrication

As discussed in the prior art section above, one limiting factor in the fabrication of DWDMs is the radius about which optical fibers may be bent. The DWDM of the present invention sidesteps the radius constraint suffered by the prior art devices by utilizing a different type of coupling technique, known as a microbend fused fiber technique. A Microbend Fused Fiber Coupler Method and Apparatus is disclosed in U.S. patent application Ser. No. 09/471,583 to the present inventor and assigned to a common assignor ("the microbend application"), and is incorporated herein by reference.

Figure 1:
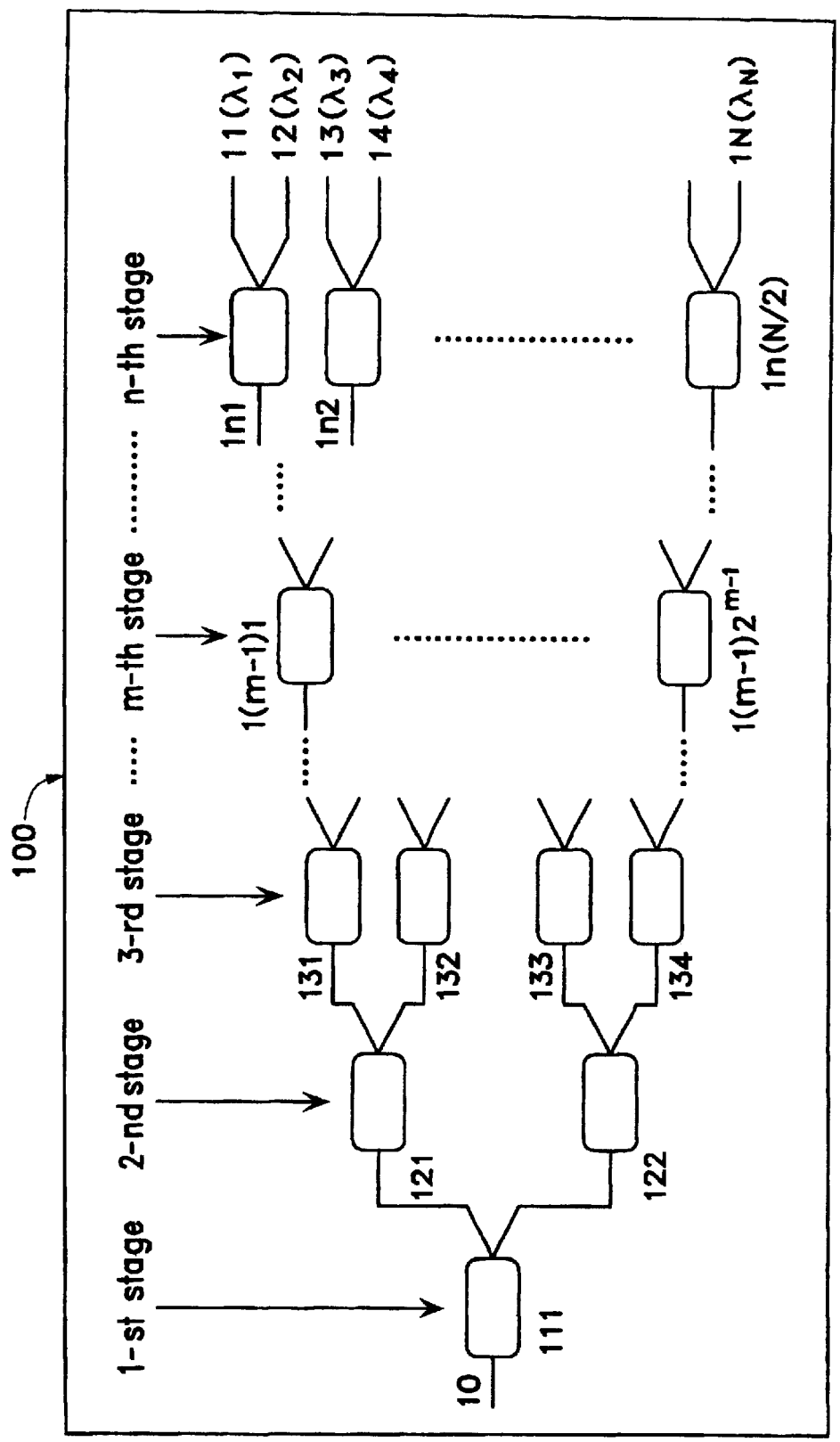
FIG. 1 is a prior art diagram of a 1×N DWDM.
Figure 2:
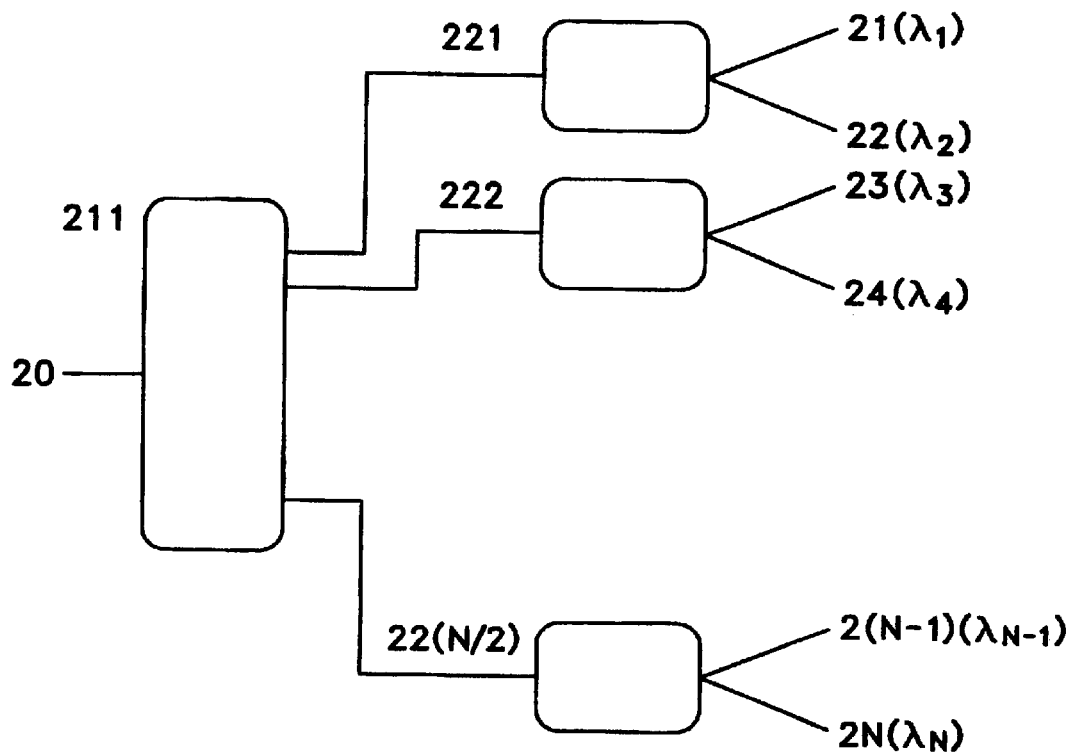
FIG. 2 is a spectral distributions of a prior art DWDM.
Figure 3A:
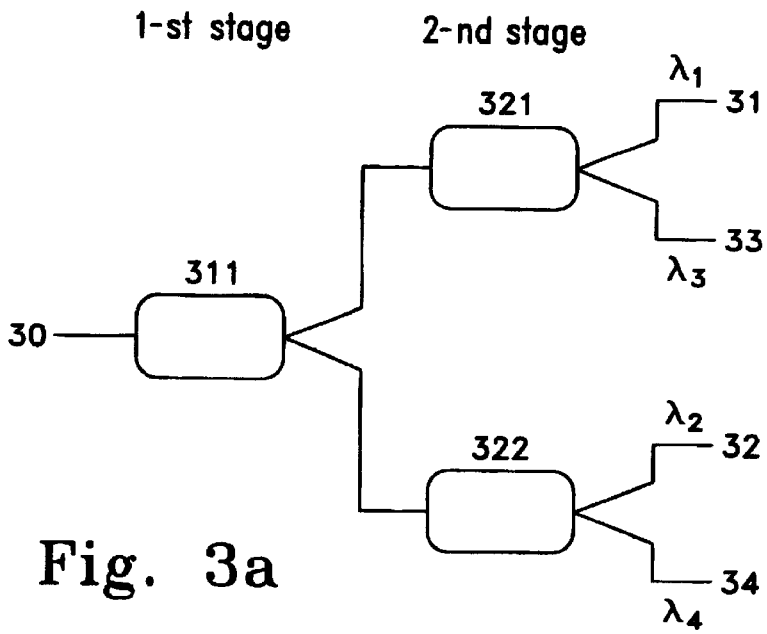
FIGS. 3A–3B are detailed embodiments of a prior art DWDM.
Figure 3B:
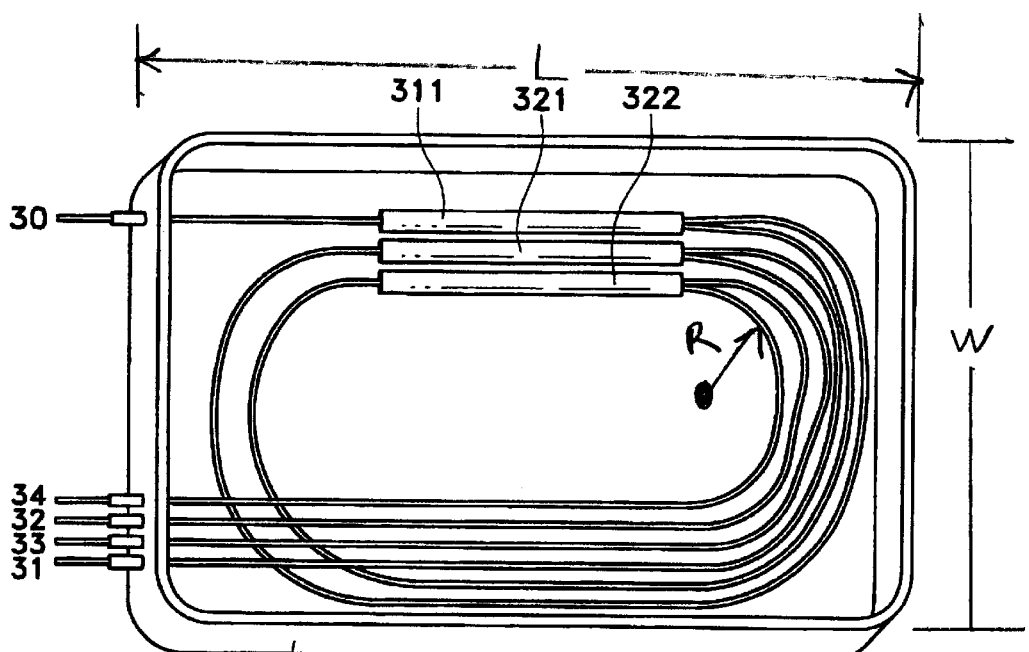
Figure 3C:
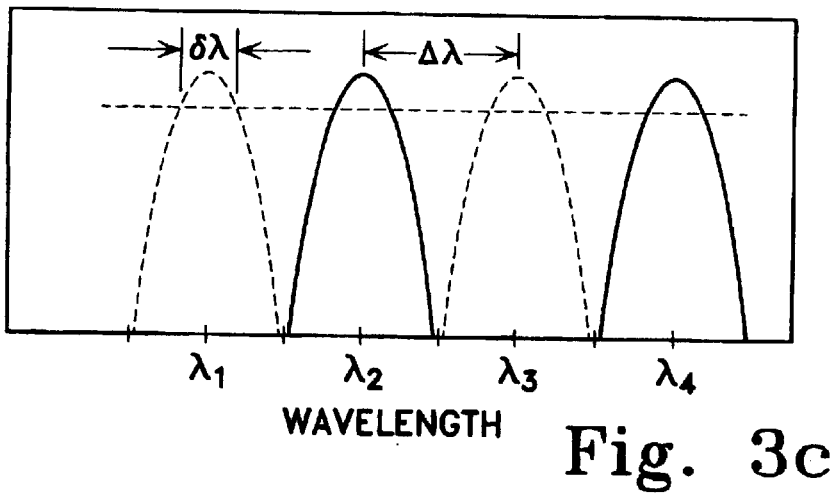
FIGS. 3C–3E are insertion loss plots of prior art MWDMs.
Figure 3D:
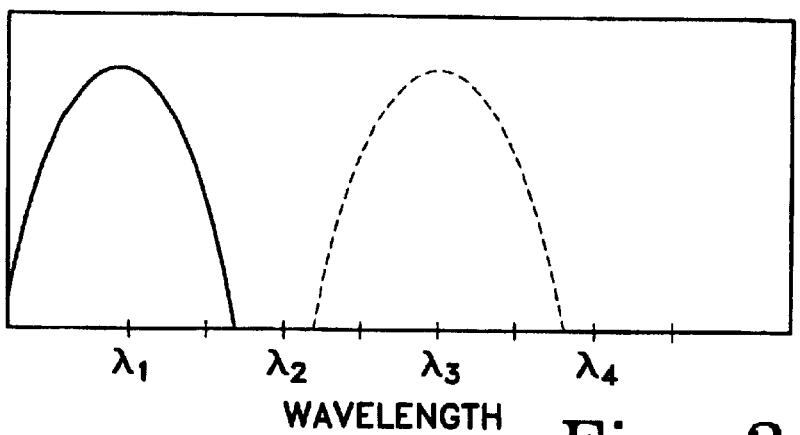
Figure 3E:
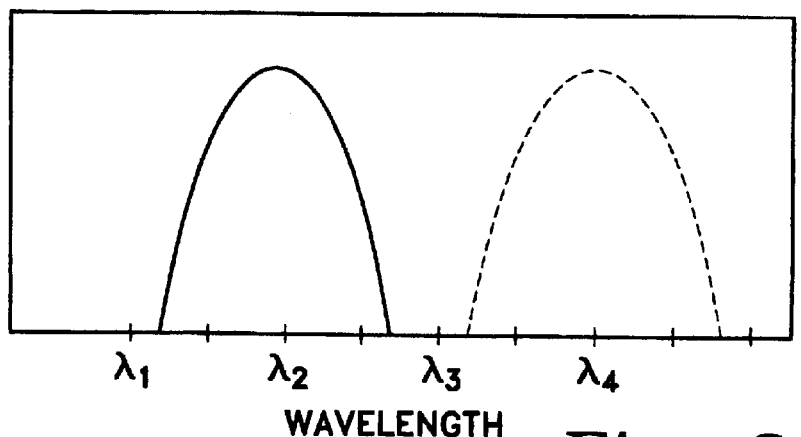
Figure 4:
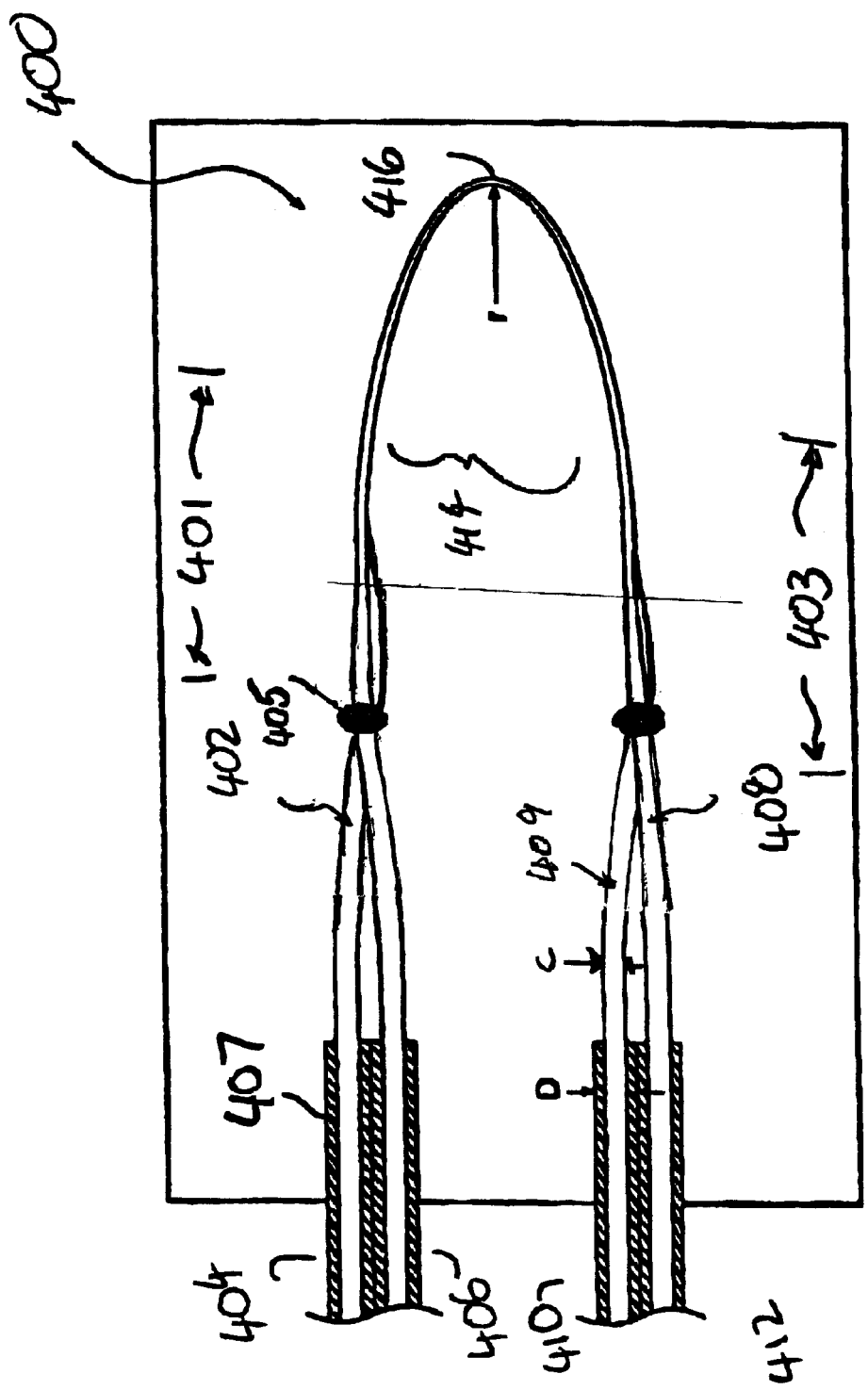
FIG. 4 is a diagram of a microbend coupler suitable for use with the present invention.

FIG. 4 is a cross-sectional diagram of a microbend coupler suitable for use in the present invention. The details of a method and apparatus for forming a microbend coupler are well documented in the microbend application and will not be detailed herein at the risk of obscuring the present invention.

From a general perspective, the microbend coupler 400 includes pigtail ends 404 and 406 and non-tapered 401. Opposite ends 404 and 406, the Y-juncture 405 tapers from the non-coupled taper region 401 into the coupled region 414. Plastic coating 407 enshrouds the fibers from the ends 404, 406, 410, and 412 up to , but not including tapered regions 410 and 403. Fiber core 409 is of a standard dimension C, preferably 9 micrometers in diameter, and 125 micrometers with cladding. Likewise, the fibers with plastic coating are of a standard dimension D, preferably 250 micrometers in diameter.

As can be seen by inspection of FIG. 4, tapered regions 401 and 403 terminate in a radius 416 through coupling region 414. It is this radius which is of interest to the present invention. As discussed in the microbend application, the radius 416 is preferably less than 20 mm, more preferably less than 10 mm, and most preferably in a range less than 5 mm. The actual radius will vary depending on the target application wavelength range, and the materials and processes used to fabricate the microbend coupler. This small radius is a great advantage to the present invention as will be shown below.

Figure 5:
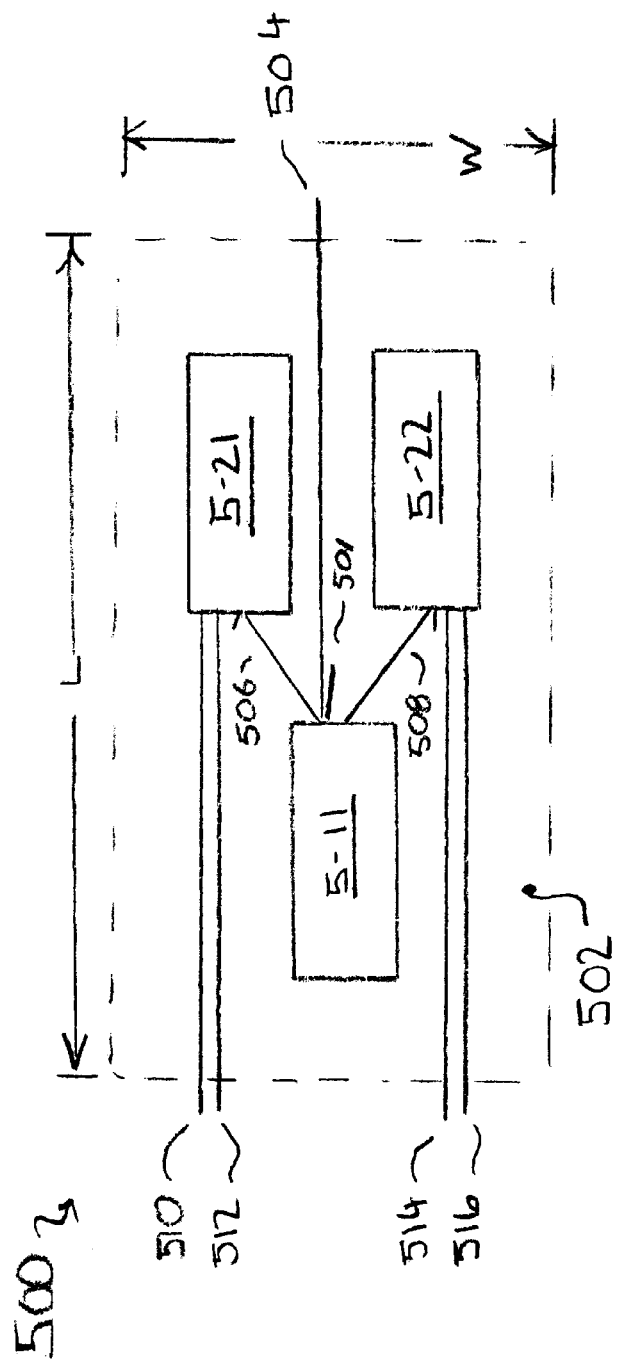
FIG. 5 is a miniature DWDM according to the present invention.

FIG. 5 is a diagram of a 1×N DWDM utilizing a microbend tree according to the present invention. In a preferred embodiment of the present invention, N=4, though it is contemplated that 1×16 DWDMs may be fabricated using the present invention. The manufacture of DWDMs of other configurations will be made possible by those of ordinary skill having been informed by this disclosure. Thus, the embodiments described herein are illustrative only and should not be used to limit the scope of the present invention.

FIG. 5 shows a miniature microbend tree 500 according to the present invention. Microbend tree 500 may be formed on a substrate 502. In an exemplary non-limiting embodiment of the present invention, substrate 502 may be formed from an environmentally stable material such as metal, ceramic, or glass, and has a length L and a width W.

Miniature MWDM tree 500 has a common terminal 504, which is optically coupled to a fiber of MWDM 5-11. In a preferred embodiment, MWDM 5-11 comprises a microbend coupler, and includes a pigtail output pair 501 which is optically coupled to MWDM 5-11. As can be seen by inspection of FIG. 5, when MWDM 5-11 is coupled to MWDM 5-11, one leg of a pigtail pair may be left unused as is standard in the art. MDWM 5-11 may be affixed to substrate 502 through means standard in the art, such as epoxy.

MWDM 5-11 is optically coupled to MWDM 5-21 and MWDM 5-22 through fibers 506 and 508, respectively, which form the output pigtail pairs of MWDM 5-11. In a preferred embodiment of the present invention, MWDMs 5-21 and 5-22 each comprise microbend couplers.

MWDM 5-21 has an output pigtail pair comprising fibers 510 and 512. Likewise, MWDM 5-22 has an output pigtail pair comprising fibers 514 and 516. In an exemplary non-limiting embodiment of the present invention, fibers 510, 512, 514, and 516 are disposed along an edge of substrate 502 opposite from common terminal 504, and the fibers are configured with optical connectors standard in the art.

In a presently preferred embodiment of the present invention, the miniature MWDM tree 500 may be encapsulated in a hermetically-sealed container for use.

As mentioned in the prior art section above, there is a need for smaller DWDMs. In a presently preferred embodiment of the present invention, a DWDM utilizing a miniature MWDM tree according to the present invention has a length of approximately 100 mm and a width of approximately 50 mm. In a further preferred embodiment, the present invention has a length of approximately 50 mm and a width of approximately 20 mm. As will be appreciated by those skilled in the art, this is a significant size savings over devices of the prior art. For example, the size of the present invention may be as small as approximately one-fifth the size of the prior art device described above.

Furthermore, as can bee seen by inspection of FIG. 5, the fabrication of a MWDM tree according to the present invention does not require the bending of any optical fibers outside of the individual MWDMs themselves. In other words, all optical fiber bends are accomplished within a microbend coupler in the present invention. No optical fibers external to the microbend couplers need be bent. This feature is an important advantage of the present invention, and facilitates the miniature size of the present invention.

Operation

In operation, a lightwave signal having wavelengths $\lambda_1$–$\lambda_4$ may be applied to common terminal 504 to accomplish a demultiplexing operation. The acts described herein may be reversed for a multiplexing operation.

Figure 6A:
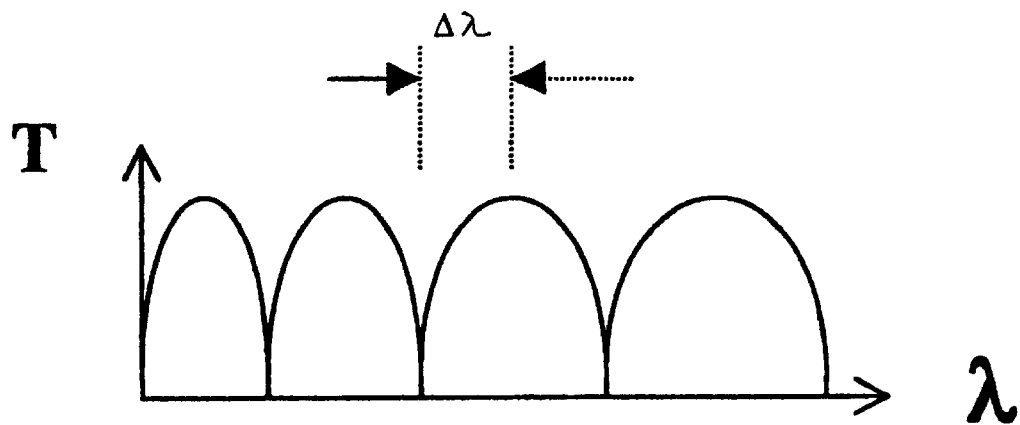
FIGS. 6A–6C are insertion loss plots representative of the present invention.

FIG. 6A shows a plot of the transmission characteristics of one channel of MWDM 5-11. As will be appreciated by those of ordinary skill in the art, the result of the demultiplexing process through MWDM 5-11 is that wavelengths $\lambda_1$ and $\lambda_3$ will be transmitted to MWDM 5-21 and wavelengths $\lambda_2$ and $\lambda_4$ will be transmitted to MWDM 5-22.

Figure 6B:
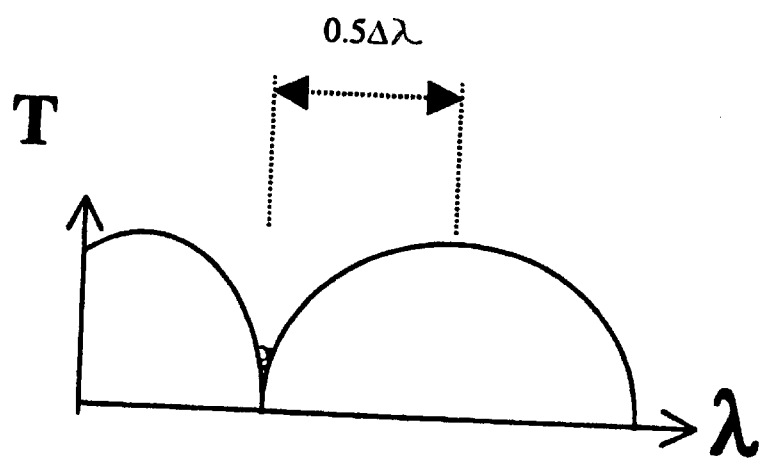

FIG. 6B shows a plot of the representative transmission characteristics of one channel of a second stage MWDM, such as MWDM 5-21 and 5-22. As will be appreciated by those of ordinary skill in the art, the result of the demultiplexing process through MWDM 5-21 is that wavelengths $\lambda_1$ and $\lambda_3$ will be transmitted to fibers 510 and 512. Likewise, as will be appreciated by those of ordinary skill in the art, the result of the demultiplexing process through MWDM 5-22 is that wavelengths $\lambda_2$ and $\lambda_4$ will be transmitted to fibers 514 and 516.

Figure 6C:
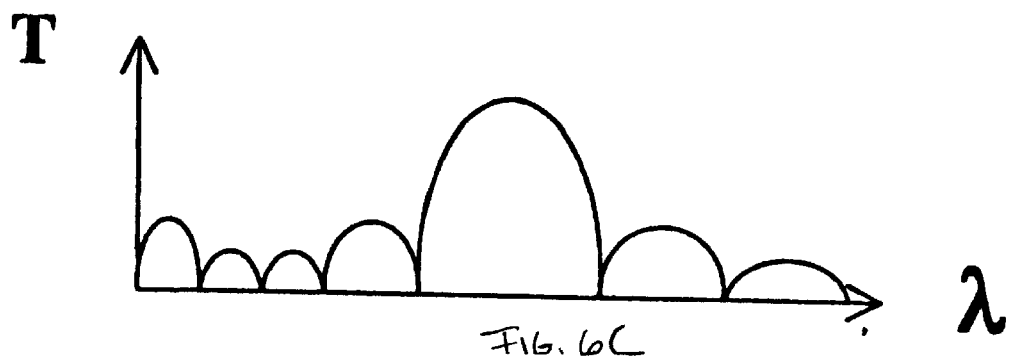

FIG. 6C shows a plot representing the response from the common port 504 to one of the other output fibers. As can be seen by inspection of FIG. 6C, only one wavelength will be transmitted from the common port to a particular output fiber.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A 1×4 dense wavelength division multiplexer (DWDM) comprising:
    a plurality of multi-window wavelength multiplexers (MWDMs) cascaded and optically coupled to form a tree; and
    wherein each of said MWDMs of said tree comprises a microbend coupler including:
        a first fiber;
        a second fiber;
        a rigid substrate; and
        wherein said first fiber and said second fiber are twisted and fused together to form a pair of Y-shaped junctions in a bend region and affixed to said substrate.

2. The 1×4 DWDM of claim 1 wherein said DWDM measures approximately 100 mm in length and 50 mm in width.

3. The 1×4 DWDM of claim 1 wherein said DWDM measures approximately 50 mm in length and 20 mm in width.

4. A dense wavelength division multiplexer (DWDM) comprising:
    a plurality of multi-window wavelength multiplexers (MWDMs) cascaded and optically coupled to form a tree, each of said MWDMs of said tree comprising a microbend coupler including:
        a first fiber;
        a second fiber;
        a rigid substrate; and
        wherein said first fiber and said second fiber are twisted and fused together to form a pair of Y-shaped junctions in a bend region and affixed to said substrate; and
    wherein said optical coupling of said plurality of said MWDMs with said tree is characterized by the absence of the bending of optical fibers external to said microbend couplers.

5. The DWDM of claim 4, where said DWDM is a 1×N DWDM.

6. The 1×N DWDM of claim 5 wherein N=4, and said DWDM measures approximately 100 mm in length and 50 mm in width.

7. The 1×N DWDM of claim 5 wherein N=4, and said DWDM measures approximately 50 mm in length and 20 mm in width.

8. A method for forming a dense wavelength division multiplexer (DWDM) comprising:
    providing a plurality of multi-window wavelength multiplexers (MWDM) cascaded and optically coupled to form a tree; and
    wherein each of said MWDMs of said tree comprises a microbend coupler including optical fibers that are twisted and fused together to form a pair of Y-shaped junctions in a bend region and affixed to a substrate.

9. The method of claim 8 wherein said DWDM formed by said method measures approximately 100 mm in length and 50 mm in width.

10. The method of claim 8 wherein said DWDM formed by said measures approximately 50 mm in length and 20 mm in width.

11. A dense wavelength division multiplexer (DWDM) comprising:
    a plurality of multi-window wavelength multiplexers (MWDMs) cascaded and optically coupled to form a tree; and
    wherein each of said MWDMs of said tree comprises a microbend coupler including:
        a first fiber;
        a second fiber;
        a rigid substrate; and
        wherein said first fiber and said second fiber are twisted and fused together to form a pair of Y-shaped junctions in a bend region and affixed to said substrate.

* * * * *

UNITED STATES PATENT AND TRADEMARK OFFICE
CERTIFICATE OF CORRECTION

PATENT NO.   : 6,546,164 B1
DATED        : April 8, 2003
INVENTOR(S)  : Peter Zupei Chen It is certified that error appears in the above-identified patent and that said Letters Patent is hereby corrected as shown below:

Column 1,
Line 56, delete "be from"

Column 6,
Line 18, change "with" to -- within --
Line 41, after "by said" insert -- method --

Signed and Sealed this

Tenth Day of August, 2004

JON W. DUDAS
*Acting Director of the United States Patent and Trademark Office*